(12) United States Patent
Ogihara et al.

(10) Patent No.: US 7,182,257 B2
(45) Date of Patent: *Feb. 27, 2007

(54) DISTRIBUTION MANAGEMENT METHOD AND SYSTEM

(75) Inventors: Masaki Ogihara, Yokohama (JP); Yasuhiko Mizuno, Sakura (JP); Rei Itsuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,803

(22) Filed: Mar. 24, 2005

(65) Prior Publication Data

US 2005/0165792 A1 Jul. 28, 2005

Related U.S. Application Data

(63) Continuation of application No. 10/222,956, filed on Aug. 15, 2002, now Pat. No. 6,880,753.

(30) Foreign Application Priority Data

Nov. 7, 2001 (JP) .............................. 2001-341370

(51) Int. Cl.
G06F 17/60 (2006.01)

(52) U.S. Cl. ...................................... 235/385; 235/487
(58) Field of Classification Search ................ 235/385, 235/375, 485, 487; 705/22, 28
See application file for complete search history.

(56) References Cited

U.S. PATENT DOCUMENTS

| 4,558,318 | A | 12/1985 | Katz et al. |
|---|---|---|---|
| 5,153,842 | A | 10/1992 | Dlugos et al. |
| 5,469,363 | A | 11/1995 | Saliga |
| 5,745,036 | A | 4/1998 | Clare |
| 5,768,384 | A | 6/1998 | Berson |
| 5,950,173 | A | 9/1999 | Perkowski |
| 5,963,134 | A | 10/1999 | Bowers et al. |
| 6,039,249 | A | 3/2000 | Szewczykowski |
| 6,073,841 | A | 6/2000 | Walton |
| 6,076,069 | A | 6/2000 | Laor |
| 6,111,953 | A | 8/2000 | Walker et al. |
| 6,131,718 | A | 10/2000 | Witschorik |
| 6,203,069 | B1 | 3/2001 | Outwater et al. |
| 6,354,492 | B1 | 3/2002 | Powell et al. |
| 6,408,278 | B1 | 6/2002 | Carney et al. |
| 6,442,276 | B1 | 8/2002 | Doljack |
| 6,453,420 | B1 | 9/2002 | Collart |
| 6,456,729 | B1 | 9/2002 | Moore |

(Continued)

FOREIGN PATENT DOCUMENTS

FR   2811454 A   1/2002

(Continued)

*Primary Examiner*—Thien M. Le
*Assistant Examiner*—Edwyn Labaze
(74) *Attorney, Agent, or Firm*—Townsend and Townsend and Crew LLP

(57) ABSTRACT

In one embodiment, a product distribution management system includes a product management center. The product management center includes a management device to receive product security data on a product from a distribution site and a product management database to store the data received from the distribution site for use in a product authentication process. The data includes product identification information and security information used to authenticate the product.

22 Claims, 8 Drawing Sheets

U.S. PATENT DOCUMENTS

| | | |
|---|---|---|
| 6,499,657 B1 | 12/2002 | van Abeelen et al. |
| 6,512,580 B1 | 1/2003 | Behringer et al. |
| 6,592,032 B1 * | 7/2003 | Takaragi et al. ............ 235/382 |
| 6,595,342 B1 | 7/2003 | Maritzen et al. |
| 6,657,542 B2 | 12/2003 | Usami |
| 6,707,539 B2 | 3/2004 | Selinfreund et al. |
| 6,985,796 B2 * | 1/2006 | Teraura et al. ............... 700/229 |
| 2001/0018669 A1 | 8/2001 | Fujiwara |
| 2003/0141358 A1 * | 7/2003 | Hudson et al. ............. 235/375 |
| 2004/0064510 A1 | 4/2004 | Ooi et al. |
| 2005/0097054 A1 * | 5/2005 | Dillon ........................ 705/51 |

FOREIGN PATENT DOCUMENTS

| | | |
|---|---|---|
| JP | 62-065163 | 3/1987 |
| JP | 11-250132 A | 9/1999 |
| JP | 2000-148950 | 5/2000 |
| JP | 2003-825008 | 4/2002 |
| KR | 10-2002-0016949 | 3/2002 |
| TW | 249852 A | 6/1995 |
| TW | 335471 | 7/1998 |
| TW | 459183 B | 10/2001 |
| TW | 466428 B | 12/2001 |
| TW | 476922 B | 2/2002 |
| TW | 505346 U | 10/2002 |

* cited by examiner

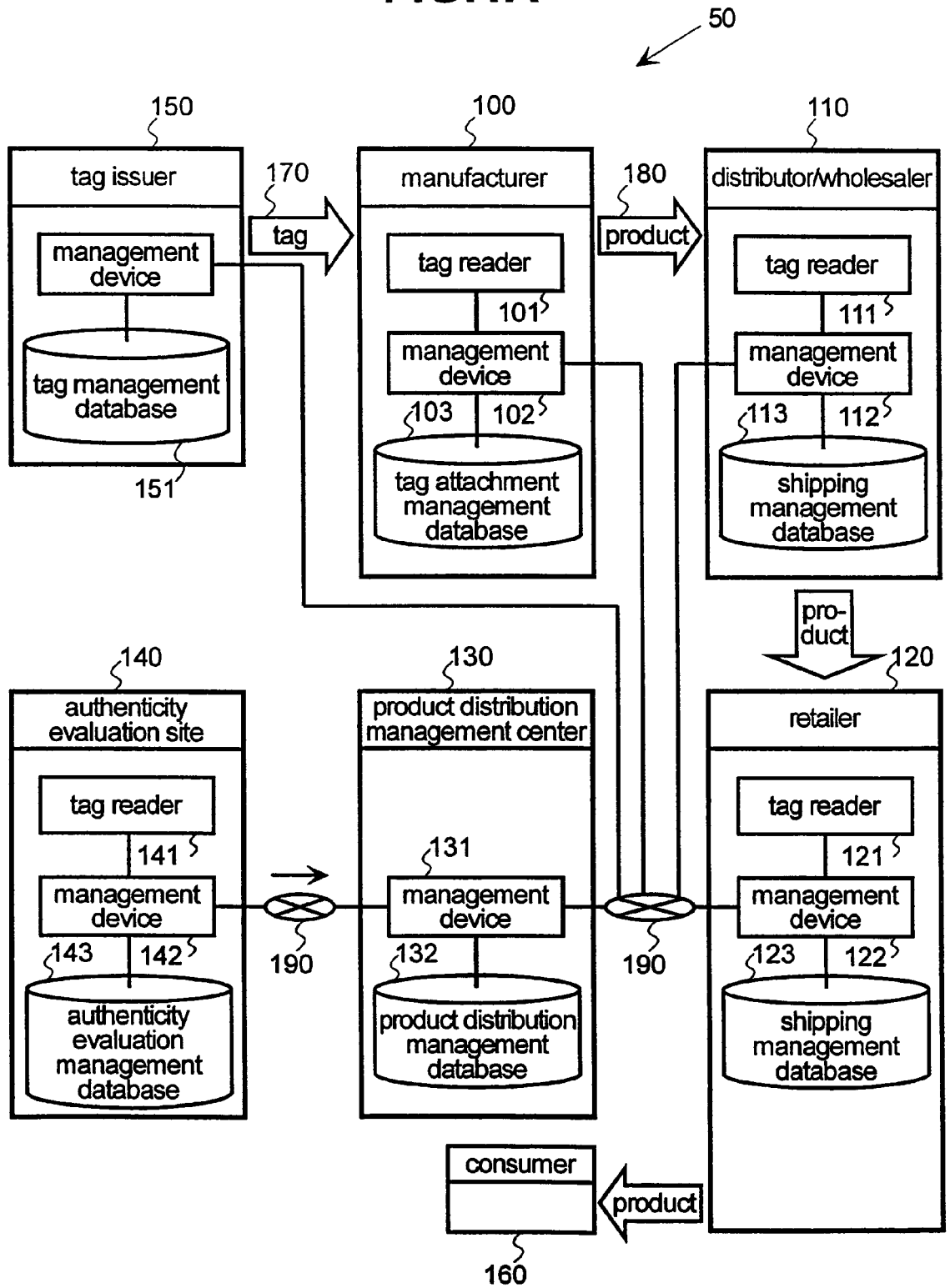

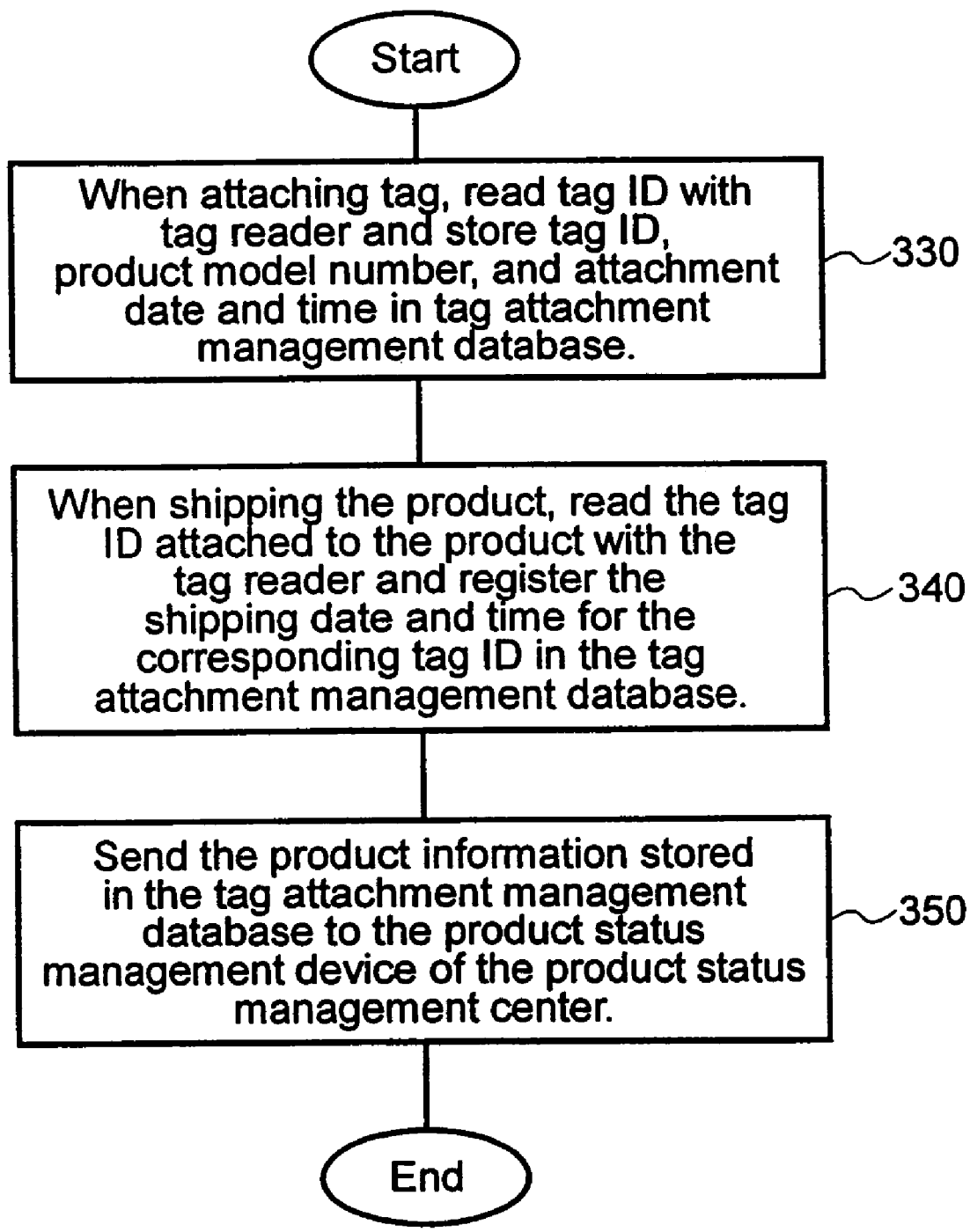

FIG.3

| tag ID | product model number | attachment date & time | shipping destination | shipping date & time |
|---|---|---|---|---|
| 1000001 | X111 | 08.14.2001 15:30 | A154 | 08.15.2001 09:20 |
| 1000002 | X112 | 09.06.2001 13:35 | A228 | 09.07.2001 10:33 |
| 1000003 | X113 | 09.18.2001 14:53 | A294 | 09.19.2001 16:54 |
| | | | | |
| | | | | |

| IC tag ID | manufacturer | | | | | distributor/wholesaler | | | | |
|---|---|---|---|---|---|---|---|---|---|---|
| | manufacturer | product model number | attachment date | shipping destination | shipping date and time | distributor /wholesaler | authenticity evaluation | | shipping destination | shipping date and time |
| | | | | | | | date and time | result | | |
| 1000001 | M121 | X111 | 08.14.2001 15:30 | A154 | 08.15.2001 09:20 | A154 | 08.17.2001 11:34 | O | R335 | 08.19.2001 12:25 |
| 1000002 | M121 | X112 | 09.06.2001 13:35 | A228 | 09.07.2001 10:33 | A228 | 09.09.2001 11:20 | O | R852 | 09.10.2001 13:11 |
| 1000003 | M121 | X113 | 09.18.2001 14:53 | A294 | 09.19.2001 16:54 | A294 | 09.20.2001 12:08 | O | R923 | 09.23.2001 11:13 |

611 612 613 614 615 621 622 623 624 625

601, 602, 610, 620

630

| retailer | authenticity evaluation | | sales date and time |
|---|---|---|---|
| | date & time | result | |
| R335 | 08.20.2001 12:21 | × | 09.02.2001 18:34 |
| R852 | 09.11.2001 14:05 | O | 09.25.2001 15:550 |
| R923 | 09.24.2001 13:33 | × | 09.29.2001 19:43 |

631 632 633 634

640

| product authenticity evaluation site | | |
|---|---|---|
| evaluation site | authenticity evaluation | |
| | date & time | result |
| J218 | 11.13.2001 14:24 | O |
| J032 | 11.19.2001 17:14 | O |
| ... | | ... |

641 642 643

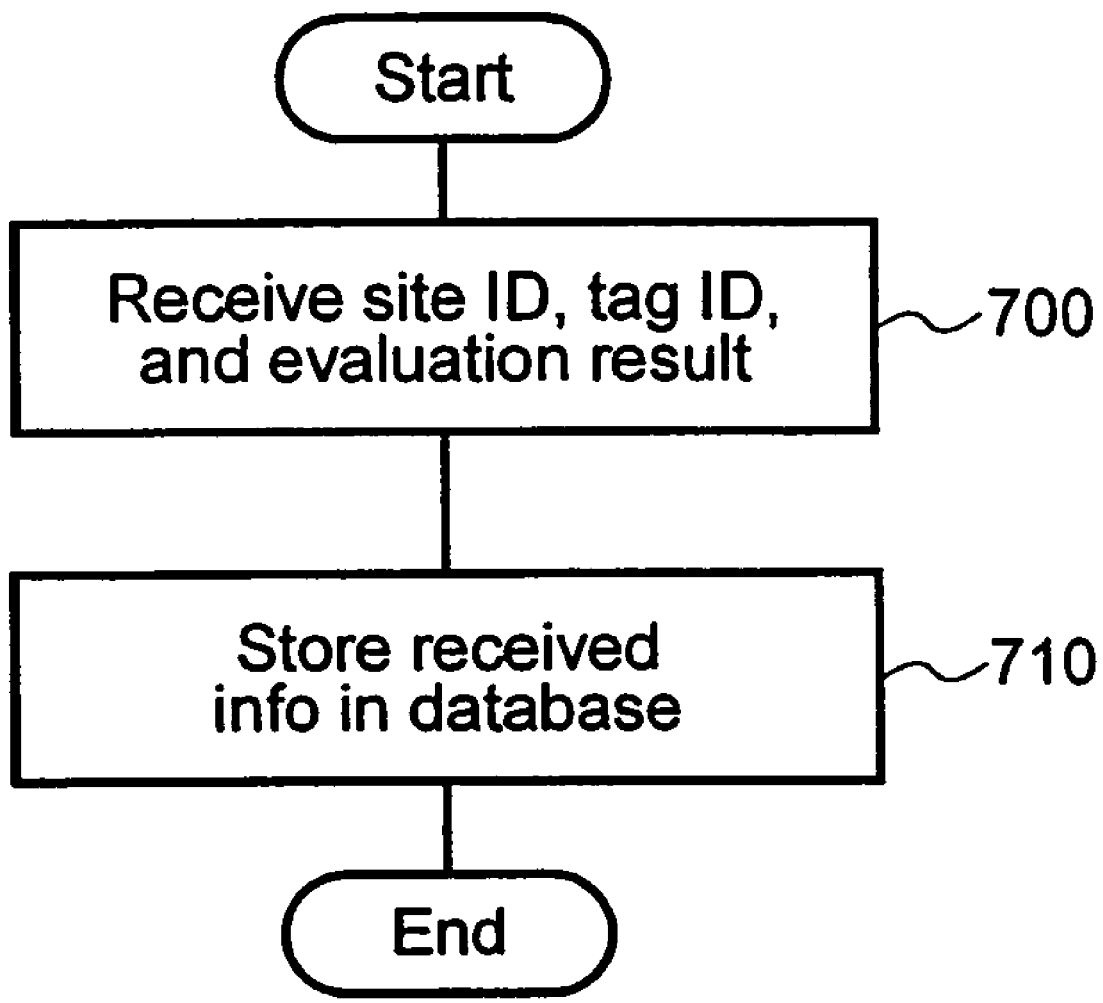

DISTRIBUTION MANAGEMENT METHOD AND SYSTEM

CROSS-REFERENCES TO RELATED APPLICATIONS

The present application is related to and claims priority from Japanese Patent Application No. 2001-341370, filed on Nov. 7, 2001.

BACKGROUND OF THE INVENTION

The present invention relates to distribution management of products such as consumer goods, intermediate goods, components, raw materials transported in containers, and the like (hereinafter referred to as "products" or "goods").

With certain brand-name products, e.g., expensive handbags or clothes, it is sometimes difficult for average consumers to distinguish between the genuine products and well-made counterfeit goods. In such a situation, an appraiser or authorized personnel from the manufacturer is needed to determine the authenticity of the products. This type of evaluations requires considerable time and effort.

Accordingly, in the distribution of products, inspection of each individual product is impractical due to time constraints and a large number of products involved. As a result, fake products are widespread and a serious concern for the manufacturers or owners of famous brand-name products. These counterfeit goods decrease the sales revenue and dilute the value of the brand names. In addition, the counterfeit goods also injure the wholesalers and consumers in the distribution chain since they are deceived into purchasing counterfeit goods at prices equivalent to that of the genuine products.

Japanese laid-open patent publication number 2000-148950 discloses a counterfeit detection system that uses an identification tag. The identification tag is attached to a product at a location where the tag is not visible to the public. The tag is coupled to data transferring means that is capable of transferring data without requiring contact and includes a non-volatile memory for storing product management information. The authenticity of a product is determined by reading the information stored in the tag.

Japanese patent number 2584963 discloses a product distribution management system, in which product identification information is stored in a product management center prior to shipping the products. This product identification information is used to register the products that are shipped to a particular receiving party. A bar code is attached to each product, and the receiving party or site uses a scanning device to read the bar code upon receiving the product. The receiving party can then authenticate the received products by comparing the product identification information, i.e., the bar code, that has been scanned with the record of products that has been shipped, i.e., the previously registered product identification information.

In the counterfeit detection system disclosed in Japanese laid-open patent publication number 2000-148950, product information and distribution site identification information are written into an ID tag attached to the product during the distribution process. The storage capacity of the ID tag, accordingly, limits the amount of information that can be entered into the ID tag. This may prevent entering important security information, e.g., the product distribution path.

Also, since numerous writing operations are performed during the distribution process, there is a risk that a person may enter false information into tag or the stored information may get corrupted due to exposure to electromagnetic fields during the product distribution process. These risks reduce the reliability of the disclosed counterfeit detection system.

In Japanese patent number 2584963, the product distribution management system receives product identification information from each distribution site upon receipt of the products. The products are then authenticated by determining whether the received product identification information has been registered previously in the system and whether the system has received an authentication request more than once from the same distribution site for that product identification information. In addition, the use of barcode is unappealing to the eyes and are not appropriate for many expensive, famous brand-name products

BRIEF SUMMARY OF THE INVENTION

In one embodiment, a product distribution management system includes a product management center. The product management center includes a management device to receive product security data on a product from a distribution site and a product management database to store the data received from the distribution site for use in a product authentication process. The data includes product identification information and security information used to authenticate the product.

In another embodiment, a product distribution management center includes a management device to receive product security data from a distribution site and a product distribution management database to store the product security data for use by another distribution site to authenticate the product. The data including tag identification information that is associated with the product and security information generated by the distribution site for use in a product authentication process.

In another embodiment, a product distribution management method includes reading identification information identifying a product at a first distribution site; associating the identification information with first security information relating to the product to generate a first distribution record; and storing the first distribution record in a product management center located at a remote location from the distribution site.

In yet another embodiment, a product authentication method includes retrieving tag identification information identifying a product at a first distribution site by reading an electronic tag attached to the product; associating the tag identification information with first security information relating to the product to generate a first distribution record, the first security information including product-distribution-related information; transmitting the first distribution record to a product management center that is provided at a remote location from the first distribution site; storing the first distribution record in the product management center; retrieving the tag identification information at a second distribution site by reading the electronic tag attached to the product, wherein the product has been received from the first distribution site; generating product data including the tag identification information at the second distribution site; transmitting the product data to the product management center from the second distribution site; retrieving at least a portion of the first distribution record from the product management center using the product data; evaluating the authenticity of the product using the retrieved portions of the first distribution record; and storing a result of the evaluation to the product management center.

BRIEF DESCRIPTION OF THE DRAWINGS

FIG. 1A is a block diagram showing a product distribution management system according to one embodiment of the present invention.

FIG. 2 is a flowchart showing a product processing performed at a manufacturer of products according to one embodiment of the present invention.

FIG. 3 is a drawing showing a data structure of a tag attachment management database according to one embodiment of the present invention.

FIG. 4 is a drawing showing a table or format of data stored in a product distribution management database according to one embodiment of the present invention.

FIG. 7 is a flowchart showing a process performed at a product distribution management center to store results of a product evaluation process according to one embodiment of the present invention.

DETAILED DESCRIPTION OF THE INVENTION

Figure 1B:
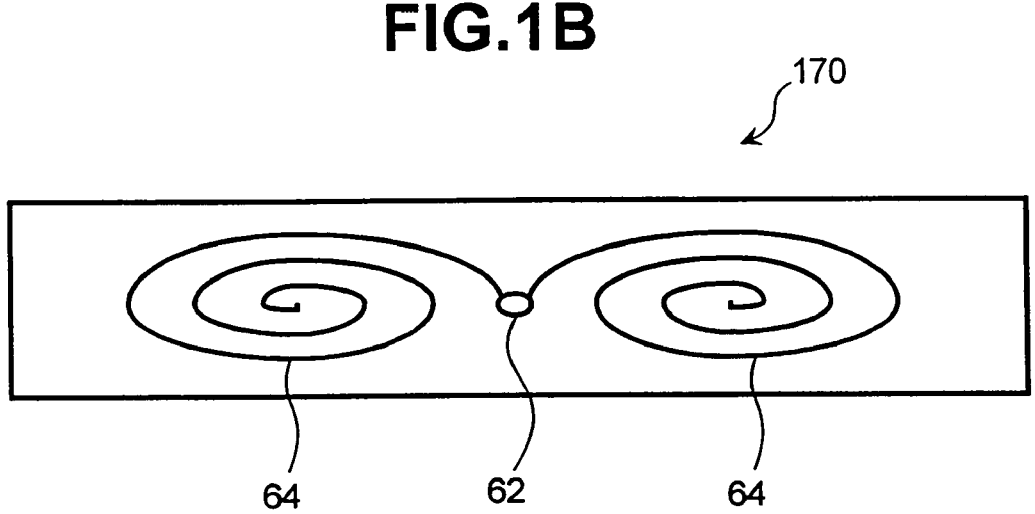
FIG. 1B illustrates a schematic top view of a tag according to one embodiment of the present invention.
Figure 1C:
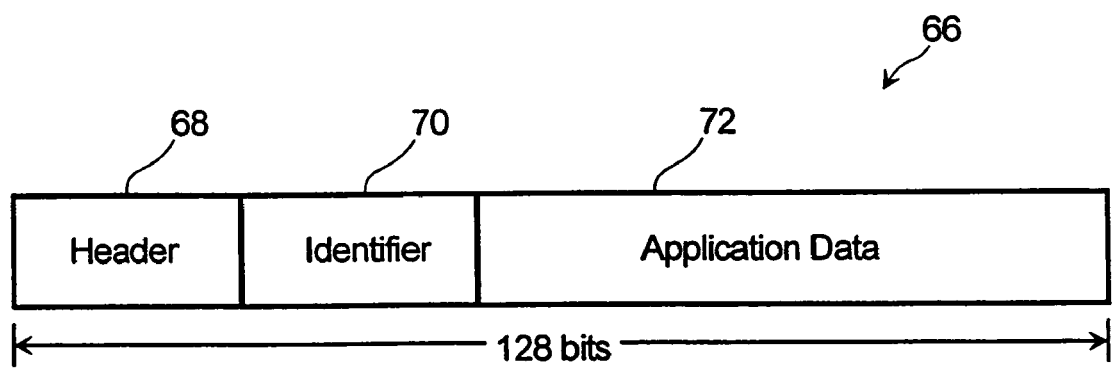
FIG. 1C illustrates an exemplary data format of a tag ID according to one embodiment of the present invention.

Embodiments of the present invention are described below using FIGS. 1–7. These embodiments are provided for illustrative purposes and should not be used to limit the present invention.

FIG. 1A shows architecture of a product distribution management system 50 according to an embodiment of the present invention. The system 50 includes a tag issuer 150, a manufacturer 100, a distributor or wholesaler 110, a retailer 120, a product management center 130, an authenticity evaluation site 140, and a consumer 160.

The manufacturer 100 manufactures a product 180 and ships it to a distributor/wholesaler 110. The distributor/wholesaler 110 ships the received product 180 to a retailer 120. The retailer 120 sells the product 180 to a consumer 160. The tag management center 150 makes and provides a tag 170, e.g., an electronic tag, to the manufacturer 100. The product distribution management center 130 stores and manages security information on the product 180 as it passes from one distribution site to another, e.g., the manufacturer 100, the distributor/wholesaler 110, the retailer 120, and the consumer 160. The product authenticity evaluation site 140 enables a person, e.g., a consumer, to authenticate the product 180. The tag 170 is an electronic device including a non-volatile memory for storing identification information. In the present embodiment, the information stored in the tag 170 is a unique identification information that is associated with a given product to identify and authenticate it. In another embodiment, the tag 170 is a non-electronic device, e.g., a bar code.

As used herein, the term "manufacturer" refers to a person or legal entity that manufactures the products or that has a proprietary interest in the products, or both. The manufacturer, accordingly, may be an owner of a trademark associated with the product who may or may not actually manufacture the goods. The product referred to in the present embodiment is a brand-name consumer good, e.g., expensive handbags or clothes, with considerable goodwill associated with it. However, the present invention may be used for other types of products, as will be understood by a person skilled in the art.

In FIG. 1A, each block is associated with a particular function, but it would also be possible for blocks to be combined or divided, e.g., the tag management center 150 and the product status management center 130 can be the same center or there can be more than one distributor/wholesaler 110.

The tag management center 150 provides the tag 170 containing tag identification information ("tag ID") or product identification information to the manufacturer 100. The tag 170 includes a memory device 62 and an antenna or transmitter 64 that is coupled to the memory device for transmitting the data stored in the memory device to an external receiver or tag reader (FIG. 1B). In one embodiment, the antenna 64 is wire bonded to the memory device. In another embodiment, the antenna and the memory device are integrated in the same substrate and fabricating using the same fabrication process. The memory device is a non-volatile memory, e.g., ROM or EEPROM, that is configured for reading data from it but not for writing data to it according to one embodiment of the present invention. The memory device has an area of 0.16 mm$^2$ (i.e., having a width and length of 0.4 mm each) and is configured to store 128 bits of data in the present embodiment. Information or data 66 stored in the memory device 52 includes a header field 68, an identifier field 70, and an application data field 72. The device is described in more detail in U.S. application Ser. No. 09/801,748, filed on Mar. 9, 2001, assigned to the assignee of the present application, which is incorporated by reference herein for all purposes.

In one embodiment, the tag ID is stored in the application data field 72. The tag issuer 150 may write to a portion of the application data field, and the manufacturer 100 and distributor 110 may write to the remaining portion of the field. Alternatively, the tag management center 150 may write to all the bit positions based on specifications determined by the manufacturer 100 and distributors 110.

FIG. 2 is a flowchart describing the step involved in shipping products to the distributor 110 by the manufacturer. At step 330, the manufacturer 100 attaches the tag 170 received from the tag issuer 150 to a product. In one embodiment, the tag is placed in a location where it cannot normally be seen, e.g., between outer and inner materials of a purse. Tag ID is read using a tag reader 101. The ID information is transmitted over the air to the reader 101 by the antenna 64 of the tag 170. A management device 102 stores the tag ID in a tag attachment management database 103. The management device 102 does not need to be a dedicated device and can be a general-purpose personal computer. Information stored in the database 103 is a record including a tag ID field for the identification information that has been read, a timestamp field for the attachment date and time, and a product model number field for the model number of the product that has been associated with the tag 170 in question. Similar records are generated for other products that are shipped out by the manufacturers.

At step 340, when the product is being shipped out, the product's tag is read using the reader 101 to retrieve its tag ID. The management device 102 receives the tag ID and associates it with first security information or product distribution information relating to the shipping destination, shipping origination, shipping date and time, and the like, that may be used to authenticate the product in the distribution process. The security information is stored in the tag attachment management database 103. The record is also sent to a management device 131 at the product distribution management center 130 via the network 190 (step 350). The management device 131, in turn, stores the record in a product distribution management database 132.

FIG. 3 shows a table 400 including a plurality of records 402 stored in the tag attachment management database 103. The records 402 are the distribution records generated in the steps 330 and 340 above. A record is generated for each tag ID, where the tag IDs 410 are associated with a plurality of fields or attributes, e.g., a product model number 420, a tag attachment time and date 430, a shipping destination 440, and a shipping time and date 450. The table 410 stored in the database 103 is used as backup data for the product status management database 132 in the distribution management center 130.

Returning to FIG. 1A, the operations involving the distributor/wholesaler 110 is described below. At the distributor/wholesaler 110, the tag of the product 180 received from the manufacturer 100 is read using a tag reader 111. The tag ID read by the reader 111 is transmitted to a management device 112. The management device 112 sends this tag ID to the management device 131 at the management center 130 via the network 190. Then, the management device 112 performs an authenticity evaluation. This authenticity evaluation will be described later. The management device 112 sends the results of the evaluation to the management device 131 at the management center 130. In another embodiment, the evaluation is performed in the product management center 130.

When the product 180 is shipped out, the reader 111 reads the tag ID from the tag 170. The tag ID is associated with second security or distribution information, e.g., the shipping date and time and the shipping destination. This security information is stored in the management database 113. In one embodiment, the reader generates the security information. In another embodiment, the management device generates the security information. The management device 112 transmits the security or distribution information to the management device 131 at the product status management center 130 for storage in the database 132.

The operations performed at the retailer 120 are similar to those performed at the wholesaler/distributor 110. The description above can apply directly if the distributor/wholesaler 110, the tag reader 111, the management device 112, and the management database 113 are replaced with the retailer 120, the tag reader 121, the management device 122, and the management database 123, respectively. Accordingly, the description of these operations is omitted here. One difference, however, is that there is generally no information that corresponds to the shipping destination information used in the distributor/wholesaler site since the product 180 is sold to the consumer 160 rather than shipped to the retailer 120.

FIG. 4 shows a table 600 including a plurality of distribution records 602 stored in the product distribution management database 132. A record is provided for each tag ID. The record includes a tag ID field 601, a manufacturer field 610, a distributor/wholesaler field 620, a retailer field 630, and a product authenticity evaluation site field 640. The manufacturer field 610 includes a plurality of sub-fields, e.g., manufacturer ID 611, a product model number 612, an attachment data and time 613, a shipping destination ID 614, a shipping date and time 615. The distributor/wholesaler 620 includes a plurality of sub-fields, e.g., a distributor/wholesaler ID 621, an authentication evaluation date and time 622, an authentication evaluation result 623, a shipping destination ID 624, and a shipping date and time 625. The retailer 630 includes a plurality of sub-fields, e.g., a retailer ID 631, an authentication evaluation date and time 632, an authentication evaluation result 633, and a sales date and time 634. The product authentication evaluation site 640 includes a plurality of sub-fields, e.g., a product authentication evaluation site ID 641, an authentication evaluation date and time 642, and an authentication evaluation result 643.

Depending on the distribution process stage or path for a product, one or more of the fields or sub-fields may be empty. For example, if the goods were sent directly from the manufacturer to the retailer, the distributor/wholesaler field 620 and its sub-fields 621–625 would be empty.

In one embodiment, the access to the product distribution management center 130 relating to data input is limited to authorized persons or parties to increases the reliability of the data stored in the management database 132. In another embodiment, persons are given limited data input authorization, so that they may write to the records relating to particular types of products, e.g., brand A shoes but not brand B shoes. In yet another embodiment, persons are given authorization to write to only records relating to selected tag IDs.

Figure 5:
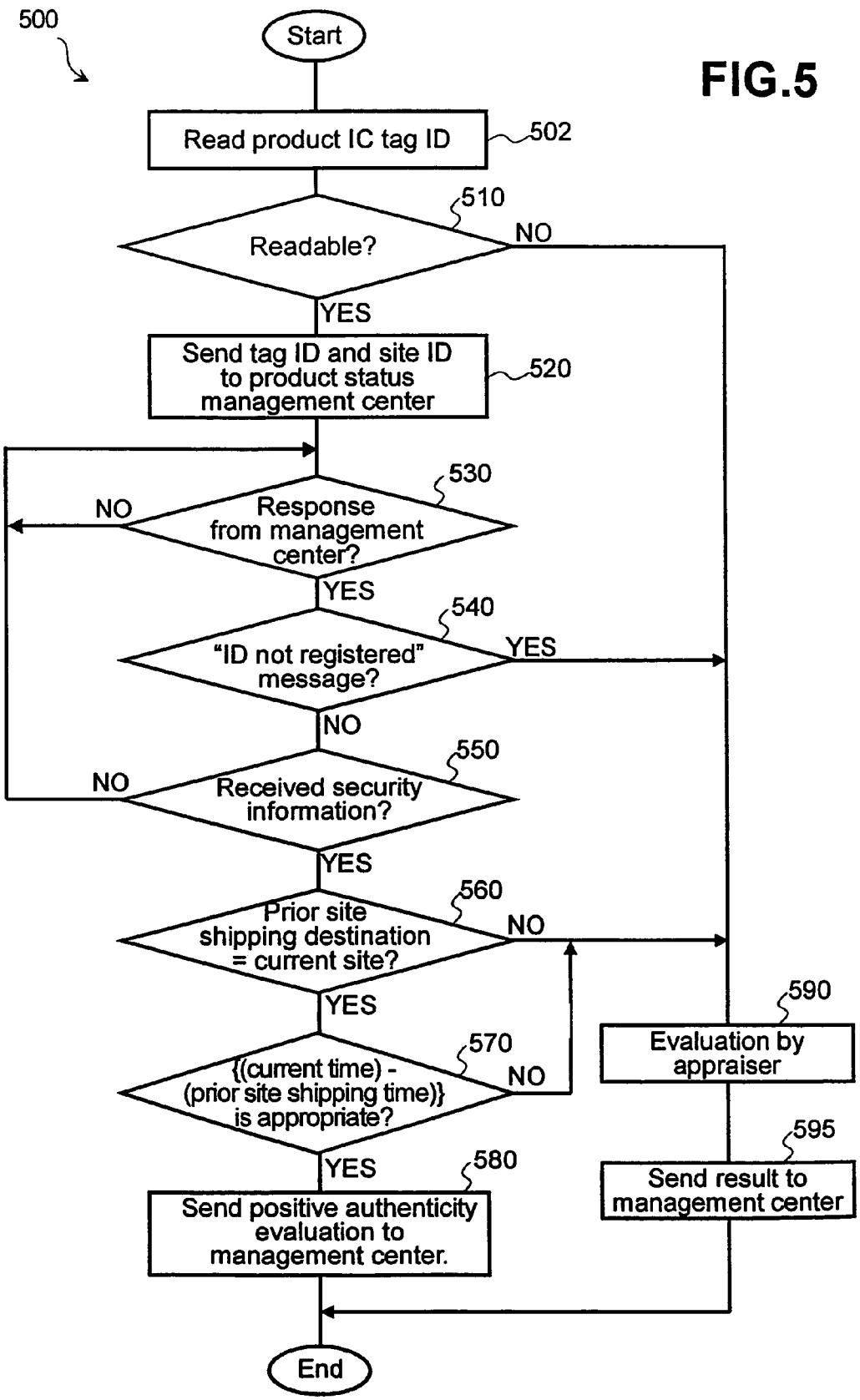
FIG. 5 shows a flowchart showing a product evaluation process performed at a distributor/wholesaler and a retailer according to one embodiment of the present invention.

Using FIG. 5, an authentication evaluation process 500 performed at the distributor/wholesaler 110 and/or the retailer 120 is described below. The tag 170 attached to the product 180 is read using the tag reader 111 or 121 to obtain the tag ID (step 502). An evaluation is made as to whether the tag ID has been successfully retrieved (step 510). If not, the process 500 indicates that an appraiser is required to evaluate the product for authentication (step 590). If the read step had been successful, the tag ID that was read and a site ID of where the reading was performed (i.e., the current site) are sent to the product distribution management center 130. The site ID may be the sub-field 621 or 631 in FIG. 4.

The process then waits for receipt of a response from the product distribution management center 130 (step 530). If a response is received, it is checked to see if it indicates "No ID registration" (step 540). If so, the process 500 jumps to step 590. Otherwise, the response is checked to see if it includes security information generated by a previous site. If not, the process returns to step 530. As used herein, the term "security information" is any information including product distribution information that is stored in the system 50 that may be used to authenticate a product independently or in conjunction with another information. The security information may be the entire record or a particular field within a record.

As used herein, the term "prior site" or "previous site" refers to a product distribution point or site from where a product is received or supplied. For example, if a product is received at the distributor/wholesaler 110, the prior site is the manufacturer 100. In one embodiment, the security information generated by the previous site is the information sent to the management center 130 by the manufacturer 100, e.g., the manufacturer ID 611, distributor/wholesaler ID 621, and the product model number 612. On the other hand, if the recipient of the product is the retailer 120, the security information includes the distributor/wholesaler ID 621 and the retailer ID 631 or shipping destination information. This shipping destination is checked to see it corresponds to the retailer that had received the product (step 560). For example, assume the tag ID is 1000001 in FIG. 1 and the current site is the retailer "R335." If the shipping destination value in the field 624 inputted by the distributor is "R335,"

a first authentication step has been passed and the process 500 proceeds to step 570. If not, the process moves to step 590 to request assistance from an appraiser.

Next, the difference between the current time and the prior site shipping time (roughly the transport time) is evaluated to see if it is appropriate (step 570). Generally, the transport path, transport means, and the like do not vary greatly between the manufacturer 100 and the distributor/wholesaler 110 and between the distributor/wholesaler 110 and the retailer 120. Duration of transportation or shipping also does not vary significantly. Thus, if transport generally takes two days, a transport time of a half-day or a week may be considered irregular. If there is change in transporting means, e.g., a change from air delivery to sea shipment, the management device 102, 112, or 122 can store the standard transport times for both means. In this case, the management center 130 receives information from the shipping site indicating what transport means is being used and stores this information in the management database 132. In one embodiment, the shipping site or location may input an estimated arrival time to the management database 132, so that this information may be used by the receiving site for authentication purposes. In this case, a standard transport time corresponding to transport means can be added to the shipping time to determine the estimated arrival time. The estimated arrival time can also be calculated by the management device 131 to reduce the burden on the management device 122 at the retailer 120.

If the evaluation at step 570 determines that the arrival time is appropriate, the authentication evaluation date and time and a "positive" evaluation result is sent in association with the tag ID (step 580). This is also output to a display device (not shown in the figure) connected to the management device. In certain cases, an appraiser can also make a simple evaluation.

On the other hand, if the determination at step 570 is negative, the process moves to step 590. At step 590, an appraiser makes a detailed evaluation of the product since there is a good chance the product may be a counterfeit. The result of the evaluation is sent to the product management center 130 (step 595). For example, the field 633 shows one negative evaluation results. These evaluation data may be collected and analyzed to determine what types of products are most frequently counterfeited or where does counterfeit problem mostly arises, etc.

By checking the transport times and distribution paths of the products as described above, the need to make detailed evaluations of each product is eliminated and authenticity evaluations can be carried out more efficiently. In addition to the above features, the process 500 may include steps to alert an appraiser or proper authority if a site sends receipt or shipping information on a particular tag ID more than once to the distribution management center 130. Ideally, each product should be received/shipped or sold/purchased once by a particular distribution site. Accordingly, the table 600 includes additional fields (not shown) to keep track of a number of times a particular tag ID has been processed by a particular distribution site according to one embodiment of the present invention.

Figure 6:
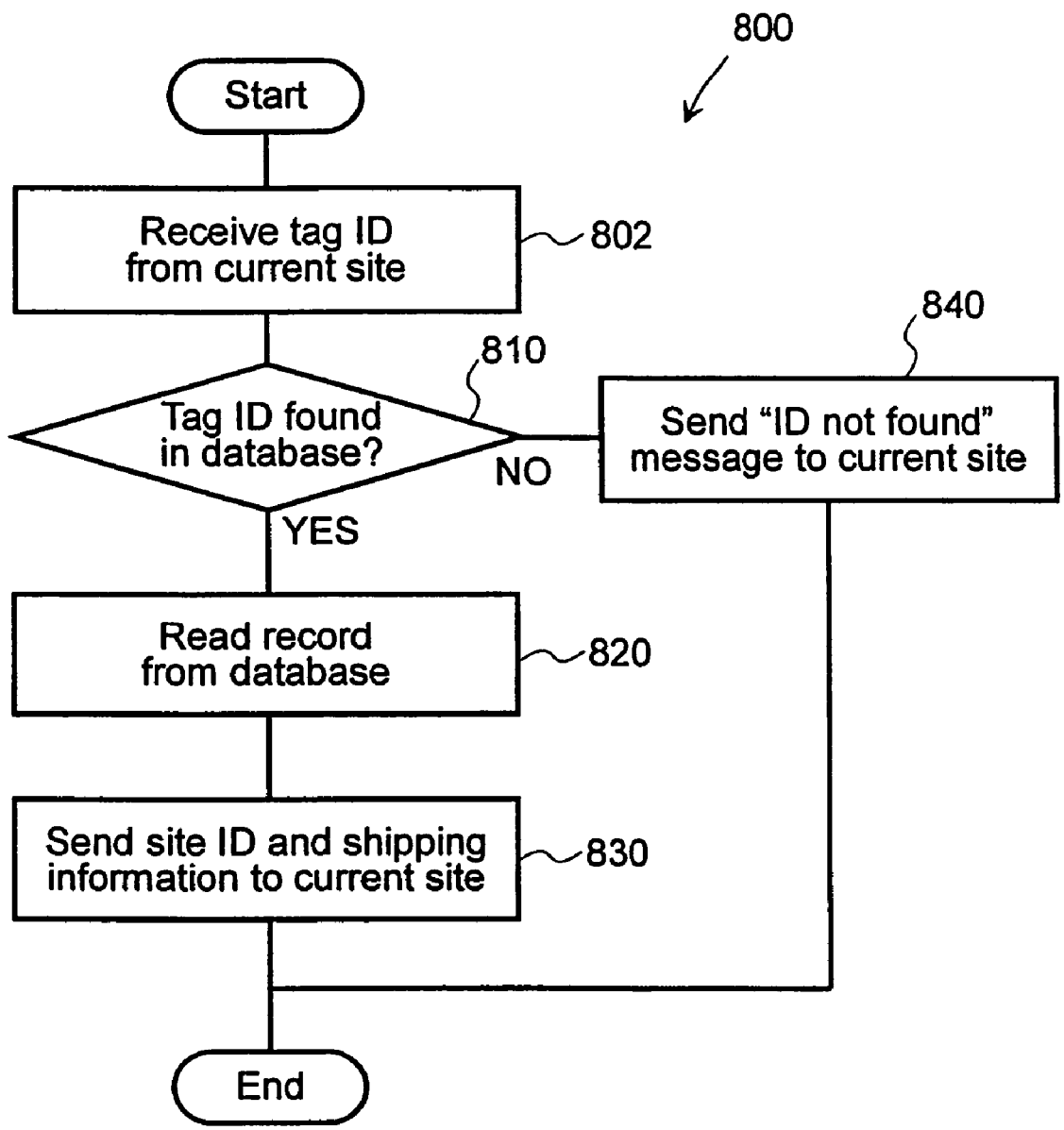
FIG. 6 is a flowchart showing a product evaluation process performed at a product distribution management center according to one embodiment of the present invention.

FIGS. 6 and 7 depict an authenticity evaluation process 800 performed at the product status management center 130 according to one embodiment of the present invention.

The management device 131 receives tag ID sent from a management device of a current distribution site, e.g., wholesaler 110 or retailer 120 (step 802). The product distribution management database 132 is searched to see if it contains a record including the tag ID (step 810). If found, the shipping site ID, the destination site ID, and the shipping date and time associated with the tag ID for the most current shipping date and time are read from the product management database 132 (step 820). These data are sent to the current site (step 830). If the tag ID is not found, information indicating "tag ID not found" is sent to the current site (step 840).

Thereafter, the management device 131 receives the current site ID, the tag ID, and the evaluation result, i.e., security information, from the management device at the current site (step 700). The management device 131 associates the received information to the appropriate distribution record in the product distribution management database (step 710).

The product distribution management center 130 is described below. The following is a description of an authenticity evaluation performed at the product management center 130, which is different from that performed in the distribution sites, as illustrated in FIGS. 5–7.

In one embodiment, the product distribution management center 130 searches the management database 132 for the tag ID. If the tag ID is not found in the database 132, the management device 131 determines that the product is likely to be a counterfeit and alerts the current site. Also, if shipping information, e.g., the date and time of shipping and the transport method, is stored in the management center 130, the management device 131 can estimate an arrival time and determine whether the product has been received within an acceptable arrival time. If the product has been received too early or too late, a caution flag is sent to the current site.

Next, the product authenticity evaluation site 140 is described. In one embodiment, the product authenticity evaluation site 140 performs authenticity evaluations independent from the typical distribution paths described above. In some instances, a distribution site may not be provided with an independent access to a management device and database. Also, the consumers 160 generally may not have independent access to such a management device and database. The evaluation site 140 enables such users without independent access to the management device and database to evaluate products.

In one embodiment, a plurality of the evaluation sites 140 are distributed at various designated locations for convenient access by users. A user desiring to authenticate the genuineness of a product 180 takes the product to the evaluation site 140. The tag ID on the product 180 is read and sent to the product distribution management center 130 using a management device 142. In response, the management center 130 transmits security information in the database 132 associated with the tag ID to the evaluation site 140. Information associated with the tag ID and the manufacturer that was issued the tag is also obtained from the tag management database 151 of the tag management center 150 when necessary. For example, the information stored in the database 151 may be used to determine whether a manufacturer is using a valid tag or a duplicate. The evaluation site 140 evaluates the genuineness of the product using the information received from the management center 130 and any other places. Alternatively, the evaluation site 140 may simply use the evaluation determinations, e.g., fields 623, 633, and 643, made by the distribution sites.

In one embodiment, the evaluation site 140 is provided in a department store or retailer to enable a consumer to check the authenticity of the product before purchasing it. A targeted advertisement of related products may be displayed with the evaluation results. For example, if a brand C shirt is evaluated for authenticity, an advertisement for other brand C products may be displayed with the evaluation results. This is possible since each tag ID uniquely identifies the product including its brand, model, and type.

Referring back to the present embodiment, the transport time from the manufacturer 100 to the distributor/wholesaler 110 is checked to see if it is within an acceptable transport time, as described above in connection with FIGS. 5–7. The authenticity verification site 140 generally does not use the current time in determining the acceptable transport time since some additional time is required for a user to bring the product to the evaluation site 140 from the time the product was initially received. In place of the current time, the date and time at which the user bringing in the product obtained the product can be used. Alternatively, the user may be asked to enter the date and time the product was initially received.

As described herein, the shipping time does not have to be the exact time at which the product was shipped. Instead, an approximate time can be used. It can be the time at which shipping data is entered into the management device since this time variance is relatively small compared to the transport time.

According to this embodiment, security information is stored at a central location rather than being stored in an electronic tag attached to the product. Thus, this information can be stored and managed using the tag ID without having to worry about the capacity or the format of the tag.

In the present embodiment, a product distribution management center is accessible by various interested parties to evaluate the authenticity of a product. The evaluation process uses the product distribution paths and transport time, as well as other security measures, thereby providing an additional level of security check.

Furthermore, the product status management data can be stored in the product management database, and product history information can be collected and managed easily.

The above detailed descriptions are provided to illustrate specific embodiments of the present invention and are not intended to limit the present invention. Numerous modifications and variations within the scope of the present invention are possible. For example, a retailer 120 may include the identity of the consumer or purchaser 160 who had purchased the product 180, so that a subsequent purchaser may verify the authenticity of the product. This method could be used to authenticate artwork, sports memorabilia, and the like. Accordingly, the present invention is defined by the appended claims.

What is claimed is:

1. A product distribution management system, comprising:
   a product management center including:
      a management device to receive product security data on a product from a distribution site, the data including product identification information and security information used to authenticate the product, wherein the product is determined to be genuine based on a time difference between shipping time of the product from a site prior to the distribution site and the current time, the security information including the shipping time; and
      a product management database to store the data received from the distribution site for use in a product authentication process.

2. The product distribution management system of claim 1, wherein the product identification information is retrieved by reading a tag attached to the product.

3. The product distribution management system of claim 2, wherein the tag is an electronic device having a non-volatile memory and an antenna.

4. The product distribution management system of claim 3, wherein the electronic device has an area of no more than about 0.4 mm$^2$.

5. The product distribution management system of claim 1, wherein the security information relates to product distribution information.

6. The product distribution management system of claim 5, wherein the product distribution information relates to information on product destination or product origination, or both.

7. The product distribution management system of claim 5, wherein the product distribution information relates to information on shipping time of the product from a distribution site, or arrival time of the product at a destination, or both.

8. The product distribution management system of claim 1, further comprising:
   an authenticity evaluation site coupled to the product distribution center and configured to access the product security data stored in the product management database to evaluate the authenticity of the product.

9. The product distribution management system of claim 1, wherein the product management center is coupled to a plurality of distribution sites including a manufacturer, a wholesaler, and a retailer, wherein the management device of the product management center is configured to receive product security data from the plurality of distribution sites.

10. A product distribution management center, comprising:
   a management device to receive product security data from a distribution site, the data including tag identification information that is associated with the product and security information generated by the distribution site for use in a product authentication process, wherein genuineness of the product is determined based on a time difference between a first point in time and a second point in time, the first point in time being associated with shipping time of the product from a first site in a distribution chain of the product, the second point in time being time associated with the distribution site, the security information including the first point in time; and
   a product distribution management database to store the product security data for use by another distribution site to authenticate the product.

11. The management center of claim 10, wherein the security information includes information relating to shipping time of the product, or arrival time of the product, or both.

12. The management center of claim 10, wherein the security information includes information relating to a destination site or origination site, or both.

13. The management center of claim 10, wherein the management database is configured to store a record including security information generated by a manufacturer, a wholesaler, and a retailer.

14. The management center of claim 10, wherein the management database is configured to store a record including security information relating to a purchaser of the product.

15. A product distribution management method, comprising:
   reading identification information identifying a product at a first site in a distribution chain of the product;

associating the identification information with first security information relating to the product to generate a first distribution record;

storing the first distribution record in a product management center located at a remote location from the first site;

receiving identification information identifying the product from a second site in the distribution chain of the product; and determining whether or not the product is genuine based on a time difference between a first point in time and a second point in time, the first point in time being associated with a given site in the distribution chain, the second point in time being associated with another site in the distribution chain, the security information including the first point in time, the time difference corresponding to shipping time of the product from the given site to the another site.

16. The method of claim 15, further comprising:

reading the identification information identifying the product at the second site;

associating the identification information with second security information relating to the product to generate a second distribution record; and storing the second distribution record in the product management center, the second distribution record being associated with the first distribution record.

17. The method of claim 15, further comprising:

reading identification information identifying the product at a third site;

associating the identification information with third security information relating to the product to generate a third distribution record; and storing the third distribution record in the product management, the third distribution record being associated with the first and second distribution records.

18. The method of claim 15, wherein the first, second, and third sites are manufacturer, wholesaler, and retailer sites, respectively.

19. The method of claim 15, further comprising:

attaching an electronic tag having the identification information to the product at a location where tag is not visible under normal circumstances, wherein the given site is the manufacturer site, and the another site is the wholesaler site.

20. The method of claim 15, further comprising:

accessing the first distribution record stored in the management database to authenticate the product that has been received at the second distribution site;

evaluating the authenticity of the product using the first security information associated with the first distribution record; and storing a result of the evaluation to the product management center.

21. A product authentication method, comprising:

retrieving tag identification information identifying a product at a first distribution site by reading an electronic tag attached to the product;

associating the tag identification information with first security information relating to the product to generate a first distribution record, the first security information including information on a first point in time;

transmitting the first distribution record to a product management center that is provided at a remote location from the first distribution site;

storing the first distribution record in the product management center;

retrieving the tag identification information at a second distribution site by reading the electronic tag attached to the product, wherein the product has been received from the first distribution site;

generating product data including the tag identification information at the second distribution site;

transmitting the product data to the product management center from the second distribution site;

retrieving at least a portion of the first distribution record from the product management center using the product data;

evaluating the authenticity of the product using the retrieved portions of the first distribution record, wherein the authenticity of the product is determined based on a time difference between the first point in time and a second point in time, the first point in time being associated with the first distribution site, the second point in time being associated with the second distribution site; and storing a result of the evaluation to the product management center.

22. The method of claim 21, wherein the evaluating step is performed in the second distribution site or the product management center, wherein the time difference relates to amount of time elapsed in shipping the product from the first distribution site to the second distribution site.

* * * * *